(12) United States Patent
Shastry et al.

(10) Patent No.: US 7,029,112 B2
(45) Date of Patent: Apr. 18, 2006

(54) INK-JET PRINTING ON SURFACE MODIFIED EDIBLES AND PRODUCTS MADE

(75) Inventors: Arun V. Shastry, Neshanic Station, NJ (US); Eyal Ben-Yoseph, Yoqneam (IL); Thomas M. Collins, Nazareth, PA (US)

(73) Assignee: Mars, Incorporated, McLean, VA (US)

( * ) Notice: Subject to any disclaimer, the term of this patent is extended or adjusted under 35 U.S.C. 154(b) by 273 days.

(21) Appl. No.: 10/211,592

(22) Filed: Aug. 5, 2002

(65) Prior Publication Data

US 2004/0021757 A1 Feb. 5, 2004

(51) Int. Cl.
*B41J 3/407* (2006.01)
*B41J 2/01* (2006.01)
*A23F 5/00* (2006.01)

(52) U.S. Cl. .............. 347/106; 347/101; 347/105; 426/303

(58) Field of Classification Search ........... 347/100, 347/96, 101, 102, 103, 105, 95; 106/31.6, 106/31.13, 31.27; 426/87, 305, 383; 428/195, 428/32.1
See application file for complete search history.

(56) References Cited

U.S. PATENT DOCUMENTS

| | | | |
|---|---|---|---|
| 3,052,552 A | 9/1962 | Koerner et al. | |
| 3,694,237 A | 9/1972 | Piotrowski | |
| 4,168,662 A | 9/1979 | Fell | |
| 4,390,369 A | 6/1983 | Merritt et al. | |
| 4,531,292 A | 7/1985 | Pasternak | |
| 4,578,273 A * | 3/1986 | Krubert ............ | 426/87 |
| 4,668,521 A | 5/1987 | Newsteder | |
| 4,670,271 A | 6/1987 | Pasternak | |
| 4,835,208 A | 5/1989 | Ball | |
| 4,843,958 A | 7/1989 | Egosi | |
| 4,910,661 A | 3/1990 | Barth et al. | |
| 5,006,362 A | 4/1991 | Hilborn | |
| 5,017,394 A | 5/1991 | Macpherson et al. | |
| 5,258,187 A | 11/1993 | Shimada | |
| 5,397,387 A | 3/1995 | Deng et al. | |
| 5,405,642 A | 4/1995 | Gilis et al. | |
| 5,435,840 A | 7/1995 | Hilborn | |
| 5,453,121 A | 9/1995 | Nicholls et al. | |
| 5,453,122 A | 9/1995 | Lyon | |
| 5,466,287 A | 11/1995 | Lyon | |
| 5,529,767 A | 6/1996 | Brox et al. | |
| 5,637,139 A | 6/1997 | Morelos et al. | |
| 5,711,791 A | 1/1998 | Croker et al. | |
| 5,800,600 A | 9/1998 | Lima-Marques et al. | |
| 5,800,601 A | 9/1998 | Zou et al. | |
| 5,834,047 A | 11/1998 | Ahn | |
| 6,022,403 A * | 2/2000 | Kuo ............ | 106/31.86 |
| 6,190,698 B1 | 2/2001 | Cochran et al. | |
| 6,274,162 B1 | 8/2001 | Steffenino et al. ....... | 424/439 |
| 6,623,553 B1 * | 9/2003 | Russell et al. ........ | 106/31.13 |
| 2003/0035870 A1 | 2/2003 | Ackley et al. | |

FOREIGN PATENT DOCUMENTS

| | | |
|---|---|---|
| EP | 0705890 | 4/1996 |
| EP | 0739957 | 10/1996 |
| FR | 2766109 | 1/1999 |
| FR | 2779732 | 12/1999 |
| GB | 2074947 | 11/1981 |
| GB | 2230868 | 10/1990 |
| GB | 2291838 | 2/1996 |
| JP | 55-23955 | 2/1980 |
| JP | 58-5285 | 1/1983 |
| JP | 62-138279 | 6/1987 |
| JP | 2-122975 | 5/1990 |
| JP | 7-81050 | 3/1995 |
| WO | 91/01649 | 2/1991 |
| WO | 91/01884 | 2/1991 |
| WO | 95/01735 | 1/1995 |
| WO | 96-02598 | 2/1996 |
| WO | 97/16075 | 5/1997 |
| WO | 00/57717 | 10/2000 |
| WO | 00/78157 | 12/2000 |
| WO | WO 01/94116 A2 * | 1/2001 |
| WO | 01/94116 | 12/2001 |
| WO | 02/047488 | 6/2002 |
| WO | WO 02/47488 A2 * | 6/2002 |

* cited by examiner

*Primary Examiner*—Manish S. Shah
(74) *Attorney, Agent, or Firm*—Fitzpatrick, Cella, Harper & Scinto

(57) ABSTRACT

Modifying the surface of an edible with a high polarity water-based glaze or polishing gum improves the printing of images on the edibles with low viscosity inks typically used in ink-jet printing. The methods described herein are suited to printing high resolution ink-jet images on edible substrate, such as a hard panned sugar shell confectionery.

13 Claims, No Drawings

INK-JET PRINTING ON SURFACE MODIFIED EDIBLES AND PRODUCTS MADE

BACKGROUND OF THE INVENTION

1. Field of the Invention

The invention is directed to printing on edibles with ink-jet compatible ink. In particular, the invention is directed to modifying the surface characteristics of edibles to facilitate printing with water-based inks which are typically used in ink-jet printing. The invention has particular applicability to methods of printing high-resolution images on soft panned and hard panned sugar shell confectionery.

2. Description of the Related Art

It is known to print identifying or decorative images on edibles, including hard panned sugar shell confectionery, such as M&M's® brand peanut and chocolate candies. Ink-jet printing eliminates the need to contact the edible substrate with a contact member such as a pad or roller. Since ink-jet printing is a non-contact printing system, slight variations in the size of edibles do not negatively impact upon printing quality, as typically occurs with pad or roller based systems. Also, an ink-jet printer image is stored as data, and not fixed on the contact member. Consequently, the overall speed and throughput of printing on edibles is increased if an ink-jet printer is used, and images can be selected, altered, transmitted, and the like, more easily than in pad printing or offset printing.

A method of ink-jet printing on edibles is described in co-pending U.S. patent application Ser. No. 09/557,108, incorporated herein by reference. A method for printing multicolor images on the surfaces of shaped edible pieces is described in co-pending U.S. patent application Ser. No. 09/479,549, also incorporated herein by reference.

Ink-jet printing on edibles, particularly high-resolution drop-on-demand ink-jet printing, usually requires the use of low viscosity inks which are readily ejectable through the tiny orifices of the ink-jet printhead. Further, the inks themselves must be edible. The dyes and colorants approved for human consumption under the Food, Drug and Cosmetic Act (FD&C) administered by the U.S. Food and Drug Administration (FDA) are all water-soluble, as are all the FDA approved natural colorants, which essentially limits such applications to using water-based inks.

Generally, these edible, low viscosity inks useful in ink-jet processes for printing on edibles are of necessity water-based. As a consequence of being water-based, the known food-grade ink-jet inks have a relatively high polarity as compared to solvent-based inks.

A protective and decorative glaze is typically coated on the surface of many hard panned sugar shell confections. Often, these additional coatings are low polarity materials, such as carnauba wax. Printing with low viscosity inks on shaped, non-planar surfaces at high rates of production, particularly on those confectionery having such low polarity surfaces, presents significant challenges. The water-based inks tend to bead up on the surface and are difficult to dry which leads to smearing Thus, there continues to be a need in the industry for methods of ink-jet printing on edibles which have surface finishes that are difficult to print on.

SUMMARY OF THE INVENTION

In one aspect, the invention is a method for ink-jet printing on an edible substrate, which comprises coating the surface of an edible substrate with a hydrophilic substance containing water, hydrocolloid, and sugar to form a polarity-modified surface; and printing an image on the polarity-modified surface using water-based ink.

The method may be used with edible substrates which are usually finished with low polarity finishes, such as wax. Such edible substrates include soft and hard panned sugar shelled confectionery. In preferred embodiments, the edible substrate is a hard panned sugar shell confectionery, the hydrophilic substance is polishing gum or water-based glaze, and once the water-based ink image is formed, a conventional wax finish is applied.

The image is preferably applied with an ink-jet printer, and may be a single component image or a composite image, in a single color or multiple colors. A composite image comprises at least two ink-jetted images in registration such that a single composite image appears to the eye. The polarity-modifying water-based glaze or polishing gum provides a surface that is more amenable to printing with water-based inks. The printed image or composite image may then be coated with conventional wax finishes. In particularly preferred embodiments the printed image obtains photographic or near-photographic resolution, on the order of 360 dots per inch.

In another aspect, the invention is not limited to the use of water-based inks, and comprises coating an edible with a hydrophilic substance comprising water, hydrocolloid and sugar to form a polarity-modified surface, ink-jet printing an image on the polarity-modified surface with solvent-based or water-based ink, and coating the edible with a hydrophobic finish. The known food-grade solvent based inks are typically pigmented inks containing pigment particles which must have small particle size if they are to be used with ink-jet printers. Again, the method is particularly applicable to hard panned sugar shell confectionery.

Another embodiment of the invention is directed to a confection comprising an edible substrate having a panned sugar shell surface, a modified-polarity coating comprising water, sugar and hydrocolloid which has been dried on the sugar shell surface, an ink-jetted image on the modified-polarity coating, and a hydrophobic finish over the ink-jetted image.

In yet another embodiment, the hydrophobic coating comprises multiple wax layers, and the image may be a single component image or a composite image, in a single color or in multiple colors. Intermediate layers of polarity-modifying substance may be added on top of a water-based ink image to fix the image, and between component images of a multi-component composite image to enhance the compatibility of the surface for a subsequently applied image.

In addition to providing a polarity modified surface for printing, the hydrophilic substance holds the colorant to the surface, and helps to maintain a defined shape to the dots which make up the image. Further, the hydrophilic coating affords a glossy, reflective background for printing, and improves the overall optical quality of printed candy and other printed edible products.

DESCRIPTION OF THE PREFERRED EMBODIMENTS

As used herein, "water-based" means containing more water than non-aqueous solvent, which generally is substantially less non-aqueous solvent than conventional food-grade inks referred to as "solvent-based".

Water-based inks typically contain some polyols, and may contain organic solvents (such as alcohols) in relatively minor amounts. Solvent-based inks typically contain some water, but much less than water-based inks. Most, but not all, food-grade solvent-based inks are pigmented inks. To those of skill in the art, water-based inks are characterized by a high enough flash point that they can be shipped without a hazardous materials warning label. Solvent-based inks require such labellings.

Any edible substrate that can be coated with a modified polarity coating to enhance the compatibility of its surface with water-based inks may be used with the invention: including pharmaceuticals, snack foods, confectioneries, and pet foods. The edible substrate may be film-coated. Preferred embodiments are directed to printing on panned sugar shell confectionery, which includes soft panned confectionery, such as jelly beans, which have a sugar shell agglomerated thereon, and hard panned sugar shell confectionery, such as M&M's® brand peanut and chocolate candies. In preferred embodiments the confectionery surface has a non-planar shape, such as a lentil or spheroid shape. These confectionery, as printing substrates, pose a particular problem in the printing of high resolution composite images, particularly where there is some variation in the size and/or shape of the confectioneries.

Ordinarily in the manufacture of hard panned sugar shell candy, successive layers of syrup are coated onto a center material in a rotating pan and dried. The details of the hard panning process are well known in the art and will not be elaborated upon herein. After completing application of the syrup layers, a wet wax coating followed by a dry wax coating develops a high gloss finish on the hard panned surface. According to the prior art, printing is then performed on the wax coating using contact type printing processes such as a pad or offset process. In such cases, the problems posed by the low polarity surface can be addressed according to the prior art by employing higher viscosity inks. However, if an ink-jet compatible water-based ink is used, the lower viscosity inks have a tendency to bead up on the non-polar surface, causing bleeding of the printed image which can lead to smearing.

Depositing a thin layer of hydrophilic substance comprising water, sugar and a hydrocolloid prior to printing an image and prior to applying a final wax finish enhances the compatibility of the surface of the hard panned confection for an ink-jet image, particularly a water-based ink-jet image. As understood herein, "hydrophilic" means more hydrophilic than a carnauba wax finish typically used as a finish coat on hard panned confections. The hydrophilic substance contains about 30 to about 75 percent by weight water, about 5 to about 50 percent by weight sugar, about 5 to about 25 percent by weight hydrocolloid, and may contain other ingredients, including flavorants, colorants, micronutrients, antibloom agents, preservatives and oils. The sugar may be a mixture of sugars, and the hydrocolloid may be a mixture of hydrocolloids. The preferred hydrophilic substance is a water-based glaze or polishing gum. Of course, the composition of the hydrophilic substance refers to the composition before it is dried on the surface of the edible substrate, and substantially all of the water is evaporated prior to printing. The hydrophilic substance makes a sugar surface smoother and less porous, effectively eliminating or reducing the roughness between the sugar grains to provide a better printing surface.

The term "hydrocolloid" as used herein refers to an edible food ingredient used to achieve textural, structural or functional characteristics in food products, such as to obtain emulsions, suspensions and foams, or as a thickener. Most hydrocolloids are significantly soluble in water and many have the ability to form gels. Most hydrocolloids are polysaccharides, including, without limitation, gum arabic, guar gum, cyclodextrin, carboxymethylcellulose, carrageenan, agar, starch and pectins. However, gelatin, a protein derived from collagen, also has the properties of a hydrocolloid and is within the scope of that term, as used herein.

Water-based glazes suitable for use in connection with the present invention comprise about 30 to about 75 percent by weight water, preferably about 45 to about 75 percent by weight water; about 5 to about 25 percent by weight hydrocolloids, preferably about 10 to about 25 percent by weight hydrocolloids; and about 5 to about 45 percent by weight sugar, preferably about 5 to about 25 percent by weight sugar. The most preferred water-based glazes comprise about 10 to about 20 percent by weight sugar, about 15 to about 25 percent by weight hydrocolloids and about 45 to about 75 percent by weight water. Although any suitable sugar and/or non-caloric sweetener could be used in a glaze in theory, sucrose is preferred. The most preferred glazes include a combination of about 11 to about 15 percent by weight sucrose, about 1 to about 3 percent by weight glucose, and about 0.1 to about 1.1 percent by weight fructose. Hydrocolloids may be selected from among those known to be suitable for this purpose by those of ordinary skill in the art. For example, the most preferred glazes contain about 15 to about 25 percent by weight of a combination of gum arabic, xanthan gum and starches. Additional optional ingredients may be included in the glaze, including flavorants, colorants, micronutrients, antibloom agents, preservatives, and oils, including hydrogenated oils, without departing from the scope of the invention. Generally such optional ingredients are present in an amount less than about 15 percent by weight. In preferred glazes, hydrogenated oil is present in an amount up to about 10 percent by weight, and citric acid and sorbic acid are present as preservatives in a combined amount up to about 0.2 percent by weight. Exemplary water-based glazes include, without limitation, Capol® brand glazes available from Centerchem Foods, Norwalk, Conn.

Suitable polishing gums contain about 30 to about 75 percent by weight water, preferably about 30 to about 50 percent by weight water; about 35 to about 50 percent by weight sugar preferably about 35 to about 45 percent by weight sugar (sucrose being preferred); and about 5 to about 25 percent by weight hydrocolloid, preferably about 10 to about 25 percent by weight hydrocolloid.(dextrin being preferred). In a most preferred embodiment, a polishing gum according to the invention contains about 30 to about 45 percent by weight water, about 35 to 45 percent by weight sugar and about 15 to about 25 percent by weight hydrocolloid. In addition to sugar, water and hydrocolloid, the polishing gum may include any of the above-mentioned other additives present in small amounts.

The polishing gum or water-based glaze is applied by spraying or other convenient means, and may advantageously be dried before applying a water-based ink image. In the most preferred embodiments, the hydrophilic substance is applied to the confections ("rolled-in") while they are in the pan.

Following the application of glaze or polishing gum, the edibles are removed from the pan and an image is printed on the substrate by ink-jet printing, preferably with a water-based ink. As used herein, "ink-jet printing" includes drop-on-demand systems, such as thermal jet and piezo jet systems, continuous jet ink-jet systems. In general, the invention concerns enhancing the compatibility of edible substrate surfaces for water-based ink, and the particular method of applying such inks is a secondary consideration. Nevertheless, those of skill in the art will recognize that there are significant differences between ink-jet systems.

Ink-jet printing systems are generally of two types: continuous jet and drop-on-demand. In continuous jet ink-jet systems, ink is emitted in a continuous stream under pressure through at least one nozzle. The stream is broken up into droplets at a fixed distance from the orifice. Typically, the ink droplets in continuous ink-jet systems are formed by a piezoelectric crystal, which is vibrated at controlled frequency adjacent to the ink stream. To control the flow of ink droplets, these inks are charged by addition of salts and other conductive agents and relayed in accordance with digital data signals. The droplets are passed through an electrostatic field, which adjusts the trajectory of each droplet. The droplets are either directed back to a gutter for recirculation or to a specific location on the substrate to create the desired image. A typical maximum resolution for a continuous jet printer image on an edible substrate using a single printhead and single-pass printing is about 70–90 dots per inch (dpi).

In drop-on-demand systems, a droplet is expelled under pressure from a valve directly to a position on the substrate in accordance with the digital data signals. A droplet is not formed or expelled unless it is to be jetted to the substrate. The formation of droplets in drop-on demand systems can either be achieved by a piezoelectric crystal (similar to continuous jet systems) or by a thermal (bubble-jet) technique. The latter technique involves formation of ink droplets by thermally heating ink in the cartridge chamber thereby forcing ink to be expelled in an "on-demand" basis. Typically, drop-on-demand systems print at a slower rate than continuous jet systems (due to time required to make droplets on demand) but produce higher resolution images. However, some of the commercially available printhead units (for example, manufactured by Xaar, Trident, Picojet and Spectra) achieve high throughput rates even with drop-on-demand systems. Also, since drop-on-demand systems require no ink recovery, charging, or deflection, these systems are simpler than the continuous jet systems. The resolution of an image printed on a shaped edible piece that can be achieved with a drop-on-demand ink-jet system can be greater than about 100 dpi, greater than about 200 dpi, and in some cases greater than about 300 dpi, up to and including photographic or near-photographic resolution (on the order of 360 dpi). As used herein "high resolution" means greater than about 100 dpi.

Both continuous jet and drop on demand systems can be adapted to multiple-pass printing, where the printhead addresses the same region of the surface of the edible to be printed in several passes to create a single image.

In preferred embodiments, a multicolor ink-jet printhead is used, such as a standard Cyan/Yellow/Magenta/Black printhead. High resolution multicolor composite images can also be printed in substantial registration by printing a first component image of one or more colors, and then printing a second component image on the glazed surface of the edible substrate over the first component image. As used herein, substantial registration means that the two or more component images of a composite image appear to form a single recognizable image when observed by the human eye.

In order to print composite images it is necessary to hold the pieces in registration so that they do not move between application of component images. Methods of accomplishing this are disclosed in the aforesaid U.S. patent application Ser. No. 09/479,549.

Ink formulations that can be used with the invention are ink-jettable. The terms "Ink-jettable" or "ink-jet compatible" are used interchangeably, and includes water-based and solvent-based inks which can be ejected through a continuous jet or drop-on-demand ink-jet print head.

Preferred water-based non-pigmented inks include water in an amount between about 30 and about 95 percent by weight, preferably between about 30 and about 85 percent by weight, and a soluble colorant in an amount between about 100 ppm and about 5 percent by weight, preferably between about 100 ppm and about 2 percent by weight. Water-based non-pigmented inks suitable for use in connection with the present invention are available under product numbers CI 15050-D, CI 10572-D, and CI 12022-D, available from Colorcon, Inc., West Point, Pa. Another series of ink-jet printing inks is commercially available from Photo-Frost Decorating Systems, Blytheville, Ariz.

It is also highly desirable to be able to print on an edible surface using pigmented inks which provide greater color opacity. Preferred water-based pigmented inks include water (typically deionized water) in an amount of about 30 to about 85 percent by weight, preferably about 30 to about 75 percent by weight; and particulates (pigments) in an amount of about 3 to about 45 percent by weight, preferably from about 3 to about 35 percent by weight. Such inks generally require a means of keeping the pigments dispersed, as known in the art. Usually, a dispersant, such as glycerine or other polyol, such as polyethylene glycol is used in an amount between 1.0 percent by weight and 50 percent by weight. Water-based pigmented inks may also contain some non-aqueous solvents, less than an amount of water in the ink, preferably in an amount less than about 40 percent by weight. Preferred water-based pigmented inks may optionally contain one or more dyes in an amount of 100 ppm to about 2 percent by weight.

An exemplary water-based white pigmented ink suitable for use in connection with the present invention comprises about 10 to about 45 percent by weight titanium dioxide; about 1 to about 48 percent by weight dispersant (preferably glycerin); about 5 to about 40 percent by weight lower molecular weight alcohol (preferably ethanol); about 30 to about 75 percent by weight water, and less than about 1 weight percent surfactant. Other water-based pigmented inks such as described in the aforesaid U.S. patent application Ser. No. 09/557,108 may be used as well. Pigmented ink must have a particle size suitable for use with an ink-jet printhead, which typically has an orifice of about 50 microns or less. Thus, it is preferred that the pigment particles in such inks have a particle size of less than about 50 microns, preferably less than about 30 microns, and most preferably between about 1 and about 5 microns.

Solvent-based inks used presently to print on sugar shell coatings having a hydrophobic surface may also be suitable for ink-jet printing on a polarity-modified surface of an edible prior to applying the hydrophobic coating. The use of solvent-based inks is not excluded from the scope of the invention. Preparing a coat of polarity modifying glaze or polishing gum to print on, prior to coating a confectionery with wax, represents a significant advancement in the art. As used herein, a "solvent-based ink" is one that contains more non-aqueous solvent than water. Solvent-based inks includes pigmented and non-pigmented solvent-based inks and also includes substantially completely fat or oil based inks. Solvent-based pigmented inks include a non-aqueous solvent present in a range of about 15 to about 80 percent by weight, and particulates present in an amount between about 5 and about 50 percent by weight.

Solvent-based non-pigmented inks may also be suitable in some instances for printing on a polarity-modified surface according to the invention. These inks are not excluded from the scope of the present invention provided that they can be deposited by ink-jet methods. Solvent-based non-pigmented inks include non aqueous solvent(s) in an amount between about 70 and about 99 percent by weight, and a colorant soluble in said solvent present in an amount between about 1 and about 30 percent by weight.

The edible ink composition according to the invention may also comprise a surfactant to improve the compatibility of the ink with the polarity modified surface of the coated edible piece. The surfactants that may be used in the ink of this invention include, for example, anionic surfactants, cationic surfactants and amphoteric surfactants. Of course, the surfactant used must be edible in the amounts used. Polyglycerol oleates, monostearates, polysorbates, mono and diglycerides, and the phospholipid family of surfactants, including without limitation lecithin, may be used for this purpose. Generally, a surfactant will be present in amounts less than about 1.0 weight percent. Most preferably, the surfactant will be present in an amount between about 0.001 and about 0.5 weight percent (based on final ink-formulation).

All of the above-described inks may also include conventional additives such as flavorings, preservatives, antifoam agents, micronutrients, dispersion stabilizers, film formers and binders, and the like, as practiced in the art.

It is preferred that the water-based or solvent-based ink used in connection with the invention be ink-jet compatible. As understood herein, ink-jet compatible inks have a viscosity of about 1 to about 45 centipoise, and a surface tension of about 15 to about 50 dynes/cm. In a pigmented ink, the average particle size is determined by the printhead channel, and is preferably less than about 50 microns, more preferably less than about 30 microns, even more preferably less than about 15 microns and most preferably less than about 5 microns.

The surface chemistry of the ink and the surface of the edible piece to be printed plays a role in determining the final image quality and resolution. The temperature of the substrate, or of the ink, can be modified using a stream of dry gas to assist the rapid drying of ink droplets on the surface of the edible piece. Temperature modulation will affect the surface energy properties of the ink and edible surface, with lower temperatures lowering surface energy and reducing the tendency of an ink to spread across the surface of the edible substrate. Applying very low humidity gas or air will enhance the drying rate of the ink droplets. Temperature modulation of the ink cartridge can also be advantageously used to modify or control ink rheology to maximize printing performance. Optimization of these parameters would be within the skill of one having ordinary skill in the art of confectionery manufacture.

The ink image may be optionally dried simply by exposing the printed piece to air without contacting the image for a period between 30 seconds and five minutes. Advantageously, convection drying with heated air evaporates solvents from the ink in less than thirty seconds, preferably less than 10 seconds. After printing and drying, or simply after printing, a further coating of water-based glaze or polishing gum or shellac can be applied to set the image. This has been found to fix the image, and reduce the likelihood of image distortion. A non-contact manner of applying the glaze, gum or shellac is used, such as spraying or air-brushing, so as not to smear the image.

If multiple component images are to be applied to form a composite image, the further coating of water-based glaze or polishing gum enhances the compatibility of the printing surface for the application of one or more additional ink-jetted images.

After printing, in preferred embodiments, the confections are returned to the pan for application of a hydrophobic finish. Preferably, the hydrophobic finish is applied in two coats, a wet wax coat comprising triglycerides and carnauba wax and a dry wax coat, consisting essentially of carnauba wax. As the application of a wax finish is well known in the art, the details of these steps will not be elaborated upon herein.

The following qualitative examples and comparative examples demonstrate the effectiveness of printing on a hard panned sugar shell coated confectionery, such as M&M's brand chocolate and peanut candies. A sugar shell of this type generally comprises: (a) a cold syrup sugar shell formed with repeated applications of cold sugar syrup; and (b) a hot syrup sugar shell, formed with repeated applications of hot sugar syrup with coloring. In a conventional process for polishing hard panned sugar shell candies, the above-described cold and hot syrup application is then followed by: (c) a wet polish (such as a gum arabic/dextrin and carnauba wax polish), which is applied and then dried onto the multi-layer sugar shell coating; and (d) a dry polish, which is typically a carnauba wax powder applied as a thin polish to the candies to give the desired shine.

To conduct comparative testing, the following samples were prepared: (1) using only cold syrup application (step (a)) without using a hot syrup coating or any coloring; (2) using cold and hot syrup applications (steps (a) and (b)), with yellow coloring; (3) using the cold and hot syrup application (steps (a) and (b)), and a wet polish (step (c)), with yellow coloring; (4) using all of steps (a) through (d) including wet and dry polishing with yellow coloring; and (5) using steps (a) and (b), but without using coloring.

The above samples (except for a control group) were hand sprayed at an air pressure of 40 psi with a water-based glaze from the Capol series (Capol 120C, Capol 127C, Capol 140C and Capol 149C), followed by drying for 10–45 minutes. Then, the samples were ink-jet printed using a Canon 6000 printer. The samples were printed with a test pattern image consisting of very thin lines and blocks of solid color using the three standard ink-jet cartridge colors: cyan, magenta and yellow. The print mode used to print the samples was "black" print mode on the Canon printer. This print mode is for high quality printing techniques. The process uses equal portions of cyan, magenta and yellow to generate a droplet of black ink. After the samples were printed using the above technique, all the samples were allowed to dry and the ink cured. Drying/curing lasted 5–10 minutes. The food-grade inks were supplied by Photofrost and contain FD&C approved food colors, water, ethanol and propylene glycol.

Prior to coating with a protective shellac-based cover (Capol 153C), each of the samples and the control were evaluated on a five-point (0–4) scale for smearing. In this scale, a score of 4 indicates that the printed sample did not smear when touched with a wet hand. A score of 3 indicates that smearing occurs when the sample is touched with a moist hand. A score of 2 means that the sample did not smear when touched with a dry hand. A score of 1 indicates that the samples did not smear when rubbed against each other, while a score of 0 indicates that the samples did smear when rubbed against each other.

The printed samples were then hand sprayed with Capol 153 C, which is a shellac-based glaze, to protect the candy surface and the images. The samples were then evaluated according the parameters of resolution and color intensity on a four-point scale with 1 being the worst and 4 being the best. The samples were evaluated under the naked eye and under microscope for print quality and dots-per-inch evaluation. The results of this evaluation are tabulated below:

TABLE 1

Control

| Sample | Color Intensity | Resolution | Smearing |
| --- | --- | --- | --- |
| (1) | 4 | 2 | 2 |
| (2) | 4 | 2 | 1 |
| (3) | 4 | 4 | 0 |
| (4) | 3 | 4 | 0 |
| (5) | 4 | 2 | 2 |

TABLE 2

Capol 120C

| Sample | Color Intensity | Resolution | Smearing |
| --- | --- | --- | --- |
| (1) | 2 | 3 | 3 |
| (2) | 2 | 3 | 3 |
| (3) | 2 | 3 | 3 |
| (4) | 2 | 3 | 3 |
| (5) | 2 | 3 | 3 |

TABLE 3

Capol 127C

| Sample | Color Intensity | Resolution | Smearing |
| --- | --- | --- | --- |
| (1) | 3 | 3 | 3 |
| (2) | 3 | 3 | 3 |
| (3) | 3 | 4 | 3 |
| (4) | 3 | 4 | 3 |
| (5) | 3 | 3 | 3 |

TABLE 4

Capol 140C

| Sample | Color Intensity | Resolution | Smearing |
| --- | --- | --- | --- |
| (1) | 2 | 3 | 3 |
| (2) | 2 | 3 | 3 |
| (3) | 2 | 3 | 3 |
| (4) | 2 | 3 | 3 |
| (5) | 2 | 3 | 3 |

TABLE 5

Capol 149C

| Sample | Color Intensity | Resolution | Smearing |
| --- | --- | --- | --- |
| (1) | 2 | 3 | 3 |
| (2) | 2 | 2 | 3 |
| (3) | 2 | 2 | 3 |
| (4) | 2 | 3 | 3 |
| (5) | 2 | 2 | 3 |

Evident from the foregoing Examples, image resolution and resistance to smearing are substantially improved when a polarity modifying coating is applied prior to ink-jet printing, as compared to printing on a finished sugar shell coated confection. Significantly, improvement is also seen (in comparison to the control) when printing is performed at different stages of the sugar shell coating process.

While the present invention has been described with respect to what are presently considered to be the preferred embodiments, the invention is not to be limited to the disclosed embodiments. Rather, the present invention encompasses various modifications and equivalents included within the spirit and scope of the appended claims. The scope of the appended claims is to be accorded the broadest interpretation so as to encompass all such modifications and equivalent materials and functions.

We claim:

1. A method for ink-jet printing on a panned confectionery, comprising the steps of:
    coating a surface of a panned confectionery with a hydrophilic substance containing water, hydrocolloid, and sugar to form a polarity-modified surface; and
    ink-jet printing at least a first ink-jet image on the polarity-modified surface with water-based ink.

2. The method of claim 1, wherein said step of coating with a hydrophilic substance comprises applying a water-based composition comprising one or more sugars in an amount of about 5 to about 50 percent by weight, water in an amount of about 30 to about 75 percent by weight, and one or more hydrocolloids in an amount of about 5 to about 25 percent by weight.

3. A method according to claim 1, wherein said step of coating with a hydrophilic substance comprises applying a water-based glaze comprising about 45 to about 75 percent by weight water, about 10 to about 25 percent by weight of one or more hydrocolloids, and about 5 to about 25 percent by weight of one or more sugars.

4. A method according to claim 1, wherein said step of coating with a hydrophilic substance comprises applying a polishing gum comprising about 35 to about 50 percent by weight of one or more sugars, about 10 to about 25 percent by weight of one or more hydrocolloids, and about 30 to about 50 percent by weight water.

5. The method of claim 1, wherein said water-based ink comprises:
    about 3 to about 45 percent by weight pigment;
    about 1 to about 50 percent by weight dispersant;
    less than about 40 percent by weight lower molecular weight alcohol; and
    about 30 to about 85 percent by weight water.

6. The method according to claim 1, comprising the step of convection drying the ink-jet image to evaporate solvents in the ink.

7. The method of claim 1, wherein said panned confectionery is a hard panned sugar shell confectionery.

8. A method for ink-jet printing on an edible substrate, comprising the steps of:
    coating a surface of an edible substrate with a hydrophilic substance containing water, hydrocolloid, and sugar to form a polarity-modified surface;
    ink-jet printing at least a first ink-jet image on the polarity-modified surface with water-based ink, and
    applying a final wax coat on the ink-jet printed image.

9. The method of claim 8, wherein said step of applying a final wax coat comprises applying a wet wax coat and applying a dry wax coat after applying the wet wax coat.

10. A method for ink-jet printing on an edible substrate, comprising the steps of:

coating a surface of an edible substrate with a hydrophilic substance containing water, hydrocolloid, and sugar to form a polarity-modified surface;

ink-jet printing at least a first ink-jet image on the polarity-modified surface with water-based ink, and applying a protecting layer of shellac, water-based glaze or polishing gum on said ink-jet printed image.

11. A method for ink-jet printing on an edible substrate, comprising the steps of:

coating a surface of an edible substrate with a hydrophilic substance containing water, hydrocolloid, and sugar to form a polarity-modified surface;

ink-jet printing at least a first ink-jet image on the polarity-modified surface with water-based ink, wherein said ink-jet printing is high resolution drop-on-demand ink-jet printing, and further comprising the step of ink-jet printing a second water-based ink image on said edible substrate in substantial registration with said first image to form a high-resolution composite image.

12. A method of claim 11, comprising the steps of drying said first image and applying a hydrophilic substance on said first image before printing said second image.

13. The method of claim 11, wherein said high resolution composite image is a multicolor image.

* * * * *

UNITED STATES PATENT AND TRADEMARK OFFICE
CERTIFICATE OF CORRECTION

| | | |
|---|---|---|
| PATENT NO. | : 7,029,112 B2 | Page 1 of 2 |
| APPLICATION NO. | : 10/211592 | |
| DATED | : April 18, 2006 | |
| INVENTOR(S) | : Arun V. Shastry et al. | |

It is certified that error appears in the above-identified patent and that said Letters Patent is hereby corrected as shown below:

On TITLE PAGE AT ITEM (56) FOREIGN PATENT DOCUMENTS

"96-02598 2/1996" should read --96/02598 2/1996--.

ON TITLE PAGE AT ITEM (56) U.S. PATENT DOCUMENTS

"Ackley et al." should read --Ackley, Jr. et al.--.

ON TITLE PAGE AT ITEM (57) ABSTRACT

Line 5, "edible" should read --an edible--..

COLUMN 1

Line 59, "smearing" should read --smearing.--.

COLUMN 4

Line 48, "hydrocolloid. (dextrin" should read --hydrocolloid (dextrin--.

COLUMN 5

Line 49, "drop on demand" should read --drop-on-demand--.

COLUMN 6

Line 61, "includes" should read --include--; and
Line 63, "includes" should read --include--.

COLUMN 9

Line 4, "according" should read --according to--.

COLUMN 10

Line 60, "ink, and" should read --ink; and--.

COLUMN 11

Line 5, "ink, and" should read --ink; and--.

UNITED STATES PATENT AND TRADEMARK OFFICE
CERTIFICATE OF CORRECTION

PATENT NO. : 7,029,112 B2
APPLICATION NO. : 10/211592
DATED : April 18, 2006
INVENTOR(S) : Arun V. Shastry et al.

It is certified that error appears in the above-identified patent and that said Letters Patent is hereby corrected as shown below:

<u>COLUMN 12</u>

Line 2, "printing, and" should read --printing; and--.

Signed and Sealed this

Fourteenth Day of August, 2007

JON W. DUDAS
*Director of the United States Patent and Trademark Office*